(12) United States Patent
Seto

(10) Patent No.: US 10,235,342 B2
(45) Date of Patent: Mar. 19, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 15/139,043

(22) Filed: Apr. 26, 2016

(65) Prior Publication Data

US 2016/0318259 A1    Nov. 3, 2016

(30) Foreign Application Priority Data

May 3, 2015    (JP) .................... 2015-094485

(51) Int. Cl.
| | |
|---|---|
| *G06F 17/11* | (2006.01) |
| *H04N 1/60* | (2006.01) |
| *B33Y 50/00* | (2015.01) |
| *G06K 15/10* | (2006.01) |

(52) U.S. Cl.
CPC ............ *G06F 17/11* (2013.01); *B33Y 50/00* (2014.12); *H04N 1/60* (2013.01); *H04N 1/6019* (2013.01); *H04N 1/6094* (2013.01); *G06K 15/105* (2013.01)

(58) Field of Classification Search
CPC ......... G06T 15/50; G06T 11/001; G09G 5/02; H04N 1/6019; G05B 19/4099; G05B 2219/49007; G05B 2219/49023; B33Y 50/00; B33Y 50/02; G06F 17/11; G06F 17/16
See application file for complete search history.

(56) References Cited

U.S. PATENT DOCUMENTS

| | | | | |
|---|---|---|---|---|
| 8,982,125 | B1* | 3/2015 | Mitev .................. | G06T 15/80 345/426 |
| 2007/0211069 | A1* | 9/2007 | Baker .................. | G06T 15/80 345/587 |
| 2010/0177319 | A1* | 7/2010 | Towers .............. | G01B 11/2504 356/511 |
| 2011/0164811 | A1* | 7/2011 | Ishiyama ........... | G06K 9/00241 382/154 |

(Continued)

OTHER PUBLICATIONS

Lan, et al., "Bi-Scale Appearance Fabrication", ACM Transactions on Graphics (TOG)—SIGGRAPH 2013 Conference Proceedings, TOG Homepage archive, vol. 32, Issue 4, Jul. 2013.

*Primary Examiner* — Jingge Wu
(74) *Attorney, Agent, or Firm* — Canon U.S.A., Inc. I.P. Division

(57) ABSTRACT

An image processing apparatus acquires information about a bidirectional reflectance distribution function of each pixel, as information about an image to be formed. Further, the image processing apparatus determines color material control information (a color material control amount) for forming color of each pixel of the image, based on the acquired information. Furthermore, the image processing apparatus determines shape information (a shape control amount) for forming a shape of each pixel of the image, based on at least the color material control information, and information indicating a specular spread component in the bidirectional reflectance distribution function of each pixel.

16 Claims, 15 Drawing Sheets

(56) References Cited

U.S. PATENT DOCUMENTS

| | | | | |
|---|---|---|---|---|
| 2012/0032973 A1* | 2/2012 | Sano | ............ | G01J 3/504 |
| | | | | 345/593 |
| 2012/0327086 A1* | 12/2012 | Shimbaru | ............ | G06T 15/80 |
| | | | | 345/427 |
| 2013/0089256 A1* | 4/2013 | Tsukada | ............ | H04N 1/62 |
| | | | | 382/167 |
| 2013/0128291 A1* | 5/2013 | Shibasaki | ............ | H04N 1/54 |
| | | | | 358/1.9 |
| 2015/0371431 A1* | 12/2015 | Korb | ............ | G06T 9/00 |
| | | | | 382/113 |
| 2016/0171748 A1* | 6/2016 | Kohlbrenner | ............ | G06T 15/10 |
| | | | | 348/48 |
| 2017/0339318 A1* | 11/2017 | Nishikawa | ............ | H04N 1/6086 |

\* cited by examiner

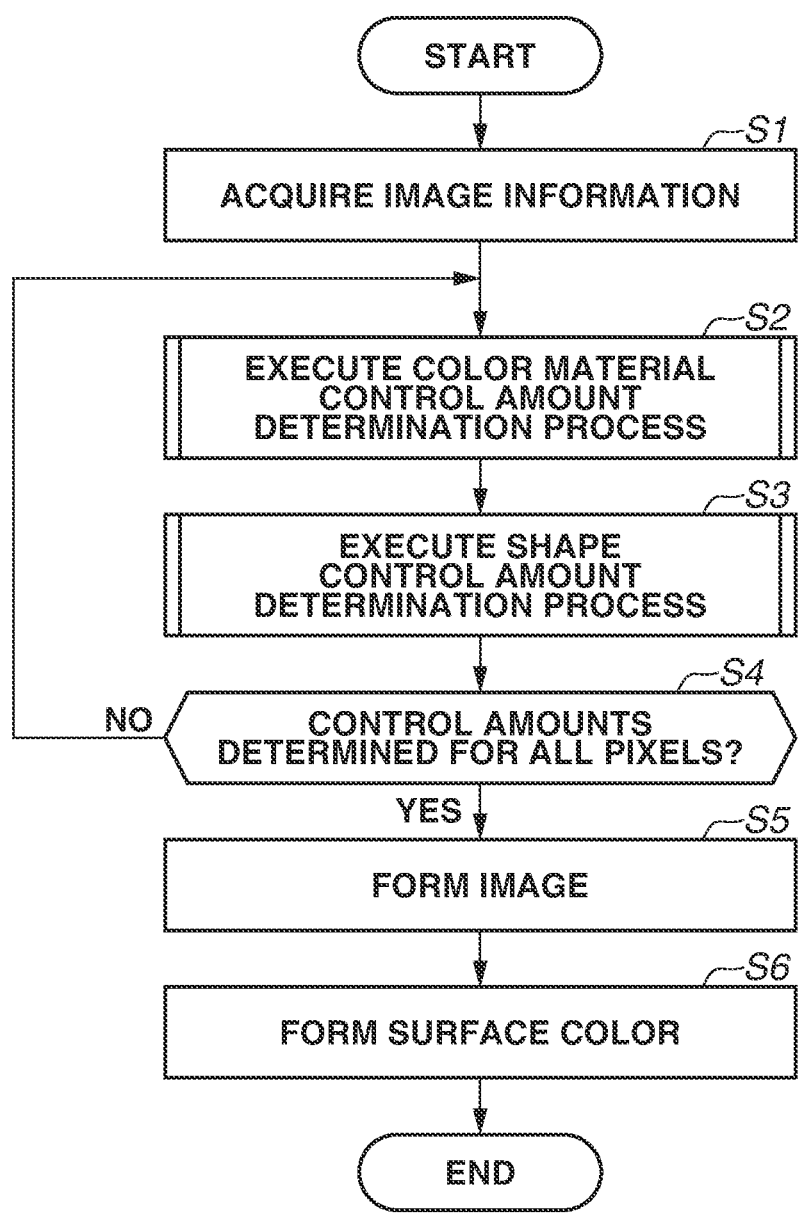

FIG.6

| R G B | ρd<br>r  g  b | ρs<br>r  g  b | αx<br>r  g  b | αy<br>r  g  b |
|---|---|---|---|---|
| 41 | 42 | 43 | 44 | 45 |
| 0, 0, 0 | 0.05, 0.06, 0.07 | 9.10, 9.20, 8.09 | 1.00, 0.96, 0.98 | 0.53, 0.54, 0.52 |
| 0, 0, 32 | 0.10, 0.12, 0.13 | 7.70, 8.10, 7.92 | 1.34, 1.11, 1.29 | 0.64, 0.72, 0.68 |
| ⋮ | ⋮ | ⋮ | ⋮ | ⋮ |

FIG.8

| Xratio | Yratio | h(p, q) | | | | |
|---|---|---|---|---|---|---|
| | | (0, 0) | (0, 1) | (0, 2) | ... | (11, 11) |
| 1.0, | 1.0 | 0, | 0, | 0, | ... | 0, |
| 1.2, | 1.0 | 0, | 0, | 0, | ... | 0, |

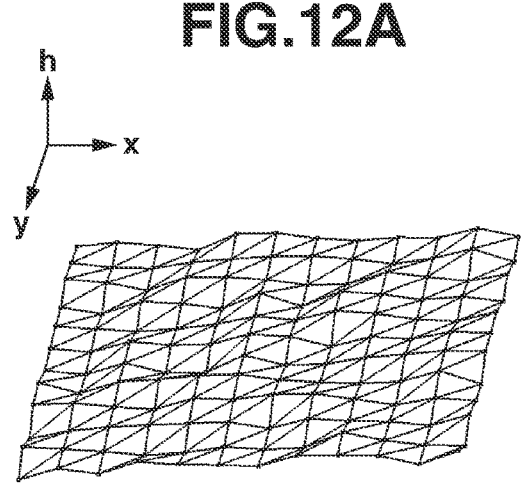
FIG.12A
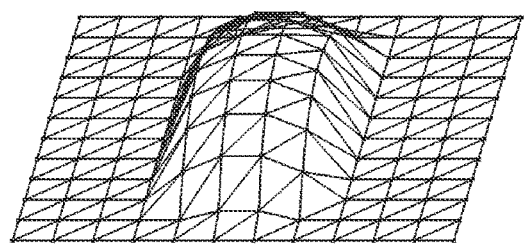
FIG.12B
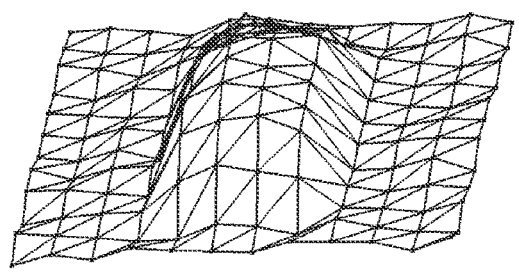
FIG.12C

IMAGE PROCESSING APPARATUS, IMAGE PROCESSING METHOD, AND STORAGE MEDIUM

BACKGROUND OF THE INVENTION

Field of the Invention

The present disclosure relates to image processing for forming an image having optical anisotropy.

Description of the Related Art

In recent years, development of technologies for controlling reflection characteristics of print images has been advanced. For example, there is an effort afoot to enhance design of a printed material by controlling glossiness distribution.

There is a technology for producing anisotropy of glossiness (angular dependence of glossiness) in a printed material. The anisotropy of glossiness is such a property that the appearance of a printed material is different depending on an observation direction. This technology is discussed in Yanxiang Lan, Yue Dong, Fabio Pellacini, Xin Tong, "Bi-Scale Appearance Fabrication", ACM Transactions on Graphics (TOG)—SIGGRAPH 2013 Conference Proceedings TOG Homepage archive, Volume 32, Issue 4, July 2013 (hereinafter referred to as "Xin Tong"). In this technology, first, a shape (height) is formed using a 3D printer, and then the shape is colored using a color printer, so that an anisotropic bidirectional reflectance distribution function (BRDF) is produced in a printed material. In this Xin Tong, one pixel is divided into a plurality of micro-areas (5×5×2=50), and a surface shape (height information) and color material information of each micro-area are determined based on the BRDF.

In the technology discussed in Xin Tong, printer control parameters need to be determined in such a manner that the BRDF achieves desired characteristics for each micro-area, to produce the anisotropy of glossiness. Specifically, it is expected to perform such complicated processing that a BRDF of a printed material is estimated from control parameters of printer, and the control parameters are optimized to minimize a difference between the estimated BRDF and a desired BRDF. Since the control parameters need to be thus determined by optimization with iteration, the calculation time increases.

SUMMARY OF THE INVENTION

The present disclosure is directed to easily producing optical anisotropy, without increase of calculator resources.

According to an aspect of the present disclosure, an image processing apparatus includes an acquisition unit configured to acquire information about a bidirectional reflectance distribution function for each pixel, as information about an image to be formed; a first determination unit configured to determine color material control information for forming color of each pixel of the image, based on the information acquired by the acquisition unit; and a second determination unit configured to determine shape information for forming a shape of each pixel of the image, based on at least the color material control information determined by the first determination unit, and first information indicating a specular spread component in the bidirectional reflectance distribution function acquired by the acquisition unit.

According to other aspects of the present disclosure, one or more additional image processing apparatuses, one or more image processing methods and one or more mediums are discussed herein. Further features of the present disclosure will become apparent from the following description of exemplary embodiments with reference to the attached drawings.

BRIEF DESCRIPTION OF THE DRAWINGS

FIG. 3 is a flowchart illustrating operation of the image processing system.

FIG. 6 is a diagram illustrating an example of a color material look-up table (LUT).

FIG. 8 is a diagram illustrating an example of a shape LUT.

FIGS. 12A, 12B, and 12C are diagrams illustrating yet another example of how the shape control amount is determined.

DESCRIPTION OF THE EMBODIMENTS

Exemplary embodiments of the present disclosure will be described in detail below with reference to the attached drawings. The exemplary embodiments will each be described below as an example of implementation of the present disclosure. The exemplary embodiments to be described below may each be modified or changed as appropriate according to a configuration of an apparatus to which the present disclosure is applied or various conditions, and are not provided to limit the present disclosure.

Figure 1:
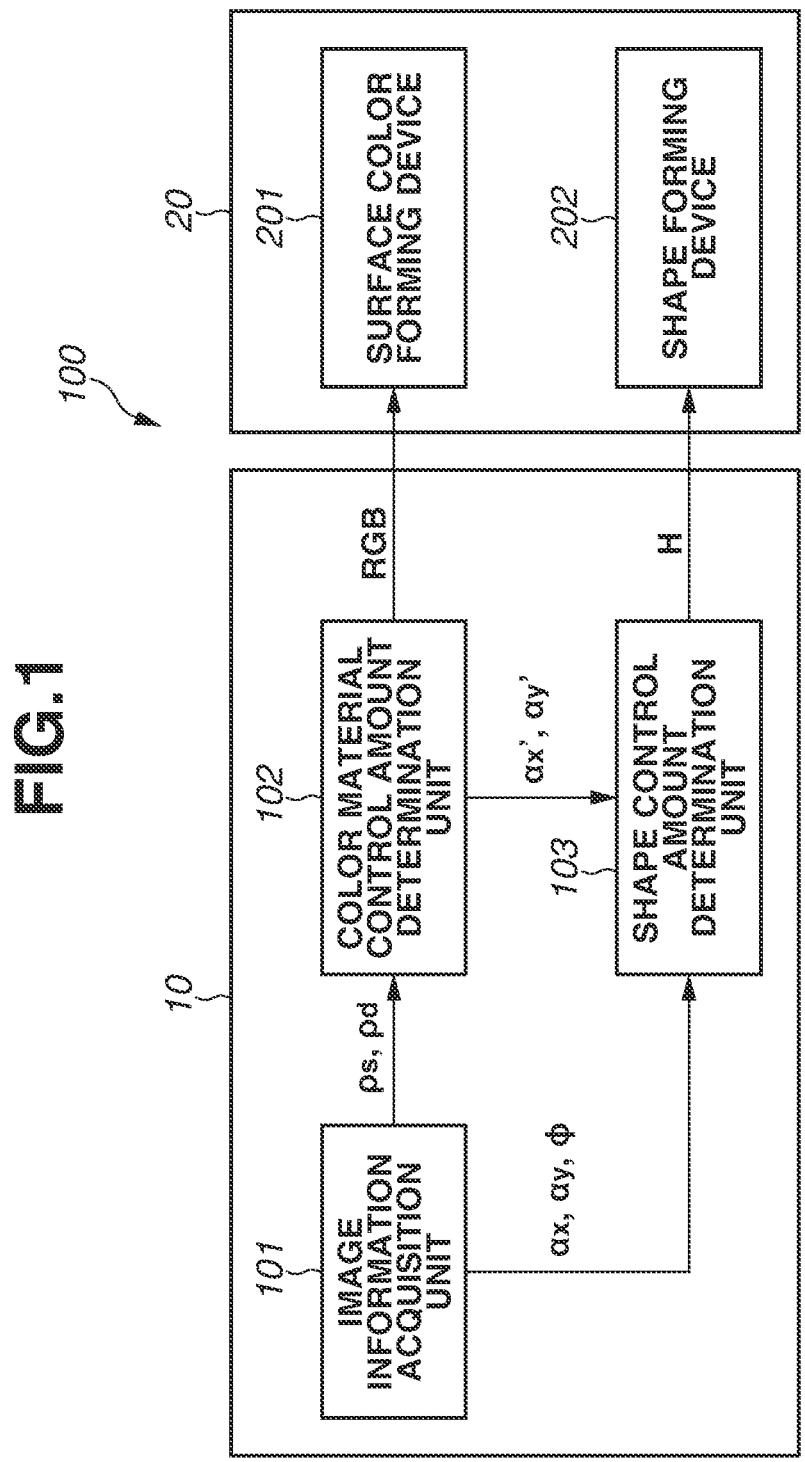
FIG. 1 is a diagram illustrating a configuration example of an image processing system including an image processing apparatus of an exemplary embodiment.

FIG. 1 illustrates a configuration example of an image forming system 100 including an image processing apparatus in a first exemplary embodiment. The image forming system 100 includes an image processing apparatus 10 and an image forming apparatus 20. The image processing apparatus 10 generates an image signal (a control amount) for forming an image in the image forming apparatus 20. The image forming apparatus 20 includes a surface color forming device 201 that forms the color of a surface of an image, and a shape forming device 202 that forms a surface shape of an image. The image forming apparatus 20 forms an image using the surface color forming device 201 and the shape forming device 202.

The surface color forming device 201 is, for example, an ultraviolet (UV) printer that applies UV curable inks of colors, such as cyan, magenta, and yellow, using an inkjet method, and cures the applied inks by irradiating the applied inks with ultraviolet light. The shape forming device 202 is, for example, a 3D printer that applies UV curable resin using an inkjet method, and cures the resin by irradiating the resin with ultraviolet light to form a three-dimensional shape. The methods of the surface color forming device 201 and the shape forming device 202 as well as the types of ink are not limited to those described above.

The image processing apparatus 10 is configured of, for example, a personal computer (PC). The image processing apparatus 10 includes an image information acquisition unit 101, a color material control amount determination unit 102, and a shape control amount determination unit 103. The image information acquisition unit 101 acquires image information about an image (a target image to be formed) that is to be formed by the image forming apparatus 20. The image information acquisition unit 101 analyzes the acquired image information and outputs information ($\rho_d$) indicating a diffuse component and information ($\rho_s$) indicating a specular intensity component of the image information, to the color material control amount determination unit 102. Further, the image information acquisition unit 101 analyzes the acquired image information and outputs information ($\alpha_x$ and $\alpha_y$) indicating a specular spread component and rotation angle information ($\varphi$) of the image information, to the shape control amount determination unit 103.

The color material control amount determination unit 102 determines a color material control amount (a color-material value RGB) based on the information input from the image information acquisition unit 101, and outputs the determined color material control amount to the surface color forming device 201. The color material control amount is color material control information for forming a surface color in the surface color forming device 201. Further, based on the color material control amount, the color material control amount determination unit 102 determines information ($\alpha_x'$ and $\alpha_y'$) indicating a specular spread component corresponding to the color material control amount, and outputs the determined information to the shape control amount determination unit 103. The shape control amount determination unit 103 determines a shape control amount (height information h) based on the information input from the image information acquisition unit 101 and the color material control amount determination unit 102, and outputs the determined shape control amount to the shape forming device 202. The shape control amount is shape information for forming a surface shape having a three-dimensional curved surface in the shape forming device 202.

Figure 2:
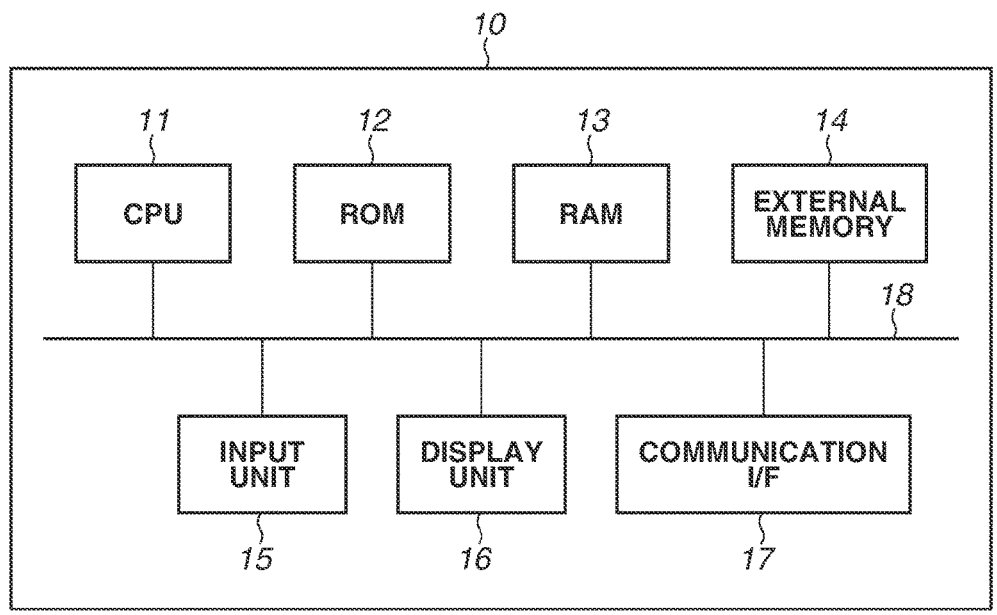
FIG. 2 is a diagram illustrating a hardware configuration example of the image processing apparatus.

FIG. 2 is a diagram illustrating a hardware configuration example of the image processing apparatus 10.

The image processing apparatus 10 includes a central processing unit (CPU) 11, a read only memory (ROM) 12, a random access memory (RAM) 13, an external memory 14, an input unit 15, a display unit 16, a communication interface (I/F) 17, and a system bus 18. The CPU 11 comprehensively controls operation in the image processing apparatus 10, and controls each component (the ROM 12 to the communication I/F 17) via the system bus 18. The ROM 12 is a nonvolatile memory that stores a control program necessary for execution of processing by the CPU 11. This program may be stored in the external memory 14 or a detachable storage medium (not illustrated). The RAM 13 serves as a main memory and a work area for the CPU 11. In other words, the CPU 11 implements various kinds of function operation, by loading a program or the like necessary for execution of processing from the ROM 12 into the RAM 13, and executing the program or the like.

The external memory 14 stores, for example, various kinds of data and various kinds of information necessary for the execution of the processing performed using the program by the CPU 11. Further, the external memory 14 stores, for example, various kinds of data and various kinds of information obtained by the processing performed using the program by the CPU 11. The input unit 15 includes a keyboard and a pointing device, such as a mouse. A user of the image processing apparatus 10 can provide instructions to the image processing apparatus 10 via the input unit 15. The display unit 16 is configured of a monitor, such as a liquid crystal display (LCD). The communication I/F 17 is an interface for communicating with an external apparatus (here, the image forming apparatus 20). The communication I/F 17 is, for example, a local area network (LAN) interface. The system bus 18 connects the CPU 11, the ROM 12, the RAM 13, the external memory 14, the input unit 15, the display unit 16, and the communication I/F 17 to each other to allow communications therebetween.

In other words, a function of each part of the image processing apparatus 10 illustrated in FIG. 1 is implemented in such a manner that the CPU 11 executes a program stored in a storage, such as the ROM 12.

Next, operation of the image forming system 100 will be specifically described with reference to FIG. 3. A process illustrated in FIG. 3 begins at a timing of when, for example, an image forming instruction is provided by the user. However, the timing to start the process illustrated in FIG. 3 is not limited to this example.

In step S1, the image information acquisition unit 101 of the image processing apparatus 10 acquires image information, and records the acquired image information in a storage, such as the RAM 13. The image information, which is input into the input unit 15, will be described below. The image information is, for example, a two-dimensional discrete image signal, and has parameters of a function that models a BRDF indicating anisotropy for each pixel, i.e., a spatially-varying BRDF (SVBRDF).

In the present exemplary embodiment, an example using an anisotropic parametric model (Ward model) represented by the below expressions will be described as a model of the BRDF. The model of the BRDF is not limited to this model, and may be any type of model if the model can express anisotropy. The expressions are as follows:

$$I_{brdf}(L, V) = \frac{\rho_d}{\pi} + f_{spe}(L, V) \tag{1}$$

and $$f_{spe}(L, V) = \frac{\rho_s}{4\pi\alpha_x\alpha_y\sqrt{\cos\theta_l\cos\theta_v}}\exp\left\{\tan^2\theta_h\left(\frac{\cos^2\phi_h}{\alpha_x^2} + \frac{\sin^2\phi_h}{\alpha_y^2}\right)\right\}, \tag{2}$$

where, L represents an illuminant vector indicating a direction of an illuminant, V represents a line-of-sight vector indicating a direction of a line of sight, $\theta_l$ represents an angle formed by a normal vector of a pixel and the illuminant vector L, $\theta_v$ represents an angle formed by the normal vector of the pixel and the line-of-sight vector V, $\theta_h$ represents an angle formed by the normal vector of the pixel and a half vector formed by the illuminant vector L and the line-of-sight vector V, $\varphi_h$ represents an angle formed by the half vector and a tangent vector (the x-axis) of the pixel, $\rho_d$ represents a diffuse component indicating an intensity of diffuse reflection, and $\rho_s$ represents a specular intensity component indicating an intensity of specular reflection, $\alpha_x$ represents a specular spread component indicating a spread in the tangent vector direction of the specular reflection, and $\alpha_y$ represents a specular spread component indicating a spread in a binormal vector direction of the specular reflection. By expressing a specular spread component using two dimensions of a tangent vector direction (x-axis) and a binormal vector direction (y-axis), optical anisotropy can be expressed.

Each pixel has the above-described four parameters ($\rho_d$, $\rho_s$, $\alpha_x$, and $\alpha_y$) for each of three pieces of color information of R (red), G (green), and B (blue). Further, the tangent vector (x-axis) can be defined to have a direction different for each pixel, and has, for each pixel, a rotation angle φ between the tangent vector of each pixel and a horizontal axis of a two-dimensional image plane. In other words, in each pixel, there is provided, in total, 13 pieces of information, which are 4 parameters ($\rho_d$, $\rho_s$, $\alpha_x$, and $\alpha_y$)×3 colors (R, G, B)+1 (rotation angle φ). Therefore, as for the above-described image information, these pieces of information are input as floating-point two-dimensional image information in which the above-described thirteen dimensions are synchronized. However, the way of inputting these pieces of information is not limited to this example.

Next, in step S2, the color material control amount determination unit 102 of the image processing apparatus 10 executes a color material control amount determination process for determining a color material control amount corresponding to a predetermined pixel, based on the image information acquired in step S1. The color material control amount determination process will be described in detail below. Next, in step S3, the shape control amount determination unit 103 of the image processing apparatus 10 executes a shape control amount determination process for determining a shape control amount corresponding to a predetermined pixel, based on the image information acquired in step S1 and the color material control amount determined in step S2. The shape control amount determination process will be described in detail below. Next, in step S4, it is determined whether all the pixels are processed (whether the color material control amount and the shape control amount are determined for all the pixels). In a case where an unprocessed pixel is present (NO in step S4), the unprocessed pixel is selected and the operation returns to step S2. In a case where all the pixels are processed (YES in step S4), the operation proceeds to step S5.

Figure 4A:
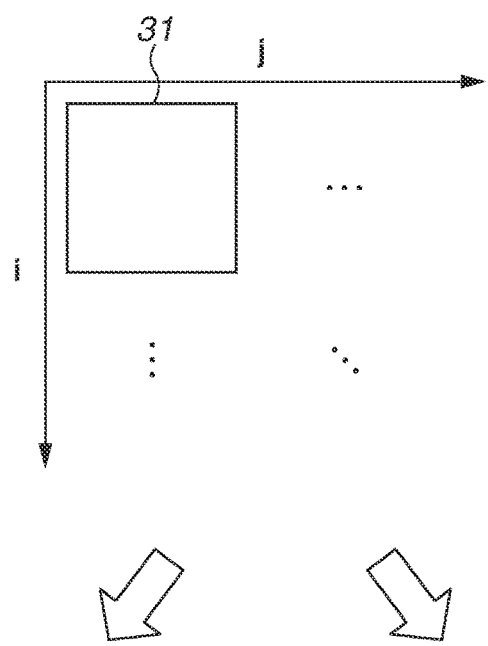
FIGS. 4A, 4B, and 4C are diagrams illustrating a color material control amount and a shape control amount.
Figure 4B:
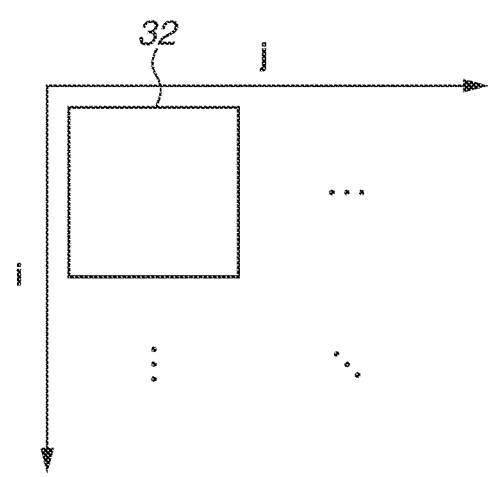

As illustrated in FIG. 4A, pixels 31 of the image information acquired in step S1 are tiled by being arranged in two-dimensional directions (i and j). The pixels 31 each have the above-described 13-dimensional information, as pixel information. The color material control amount determination unit 102 determines, for example, information in which 8 bits of each of R (red), G (green), and B (blue) are synchronized, as the color material control amount for forming a surface color at each position 32 corresponding to different one of the pixels 31 as illustrated in FIG. 4B. The surface color forming device 201 determines a colorant amount of color, such as cyan, magenta, yellow, and black (CMYK), for this color material control amount of R, G, and B. The surface color forming device 201 then forms a surface color by applying predetermined ink to a predetermined base-material surface and fixing the applied ink. The present exemplary embodiment is described using the case where R, G, and B are determined as the color material control amount, but is not limited to this case. For example, color information corresponding to CMYK and a particular color may be determined as the color material control amount.

Figure 4C:
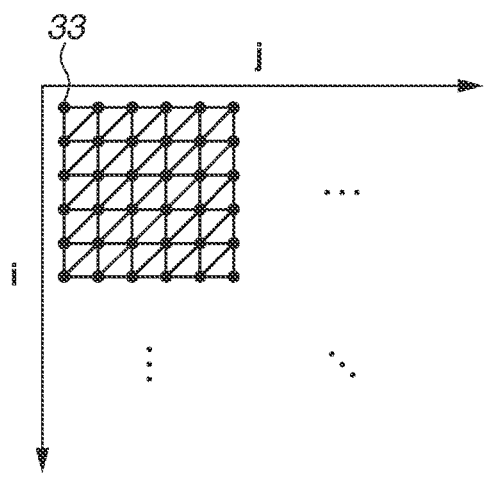

The shape control amount determination unit 103 determines height information of 6×6, as the shape control amount corresponding to each of the pixels 31, as illustrated in FIG. 4C. In other words, when the number of pixels is assumed to be Ni vertically, and Nj horizontally, the number of grid points to be determined by the shape control amount determination unit 103 is 6×Ni vertically, and 6×Nj horizontally. Here, the shape control amount determination unit 103 determines, for example, 8-bit information for each of grid points 33, as the shape control amount (height information). The shape forming device 202 creates an irregular shape on a predetermined base-material surface of a material, such as resin, based on the shape control amount. The present exemplary embodiment is described using the case where the height information of 6×6 is controlled for one pixel, but is not limited to this case. The number of grid points and the number of bits are not limited to those in this case.

In this way, the SVBRDF is produced in a printed material by determining the shape and color material of each pixel and controlling the determined shape and color material. In the present exemplary embodiment, one pixel of the SVBRDF is produced using the height information (shape information) of 6×6 grid points and a color-material value that is uniform in one pixel (all polygons are identical).

In step S5 in FIG. 3, using a material such as resin, the shape forming device 202 forms an image having a three-dimensional shape on the base-material surface based on the shape control amount determined by the shape control amount determination unit 103 in step S3. In step S6, based on the color material control amount determined by the color material control amount determination unit 102 in step S2, the surface color forming device 201 colors the image formed by the shape forming device 202 in step S5.

Figure 5:
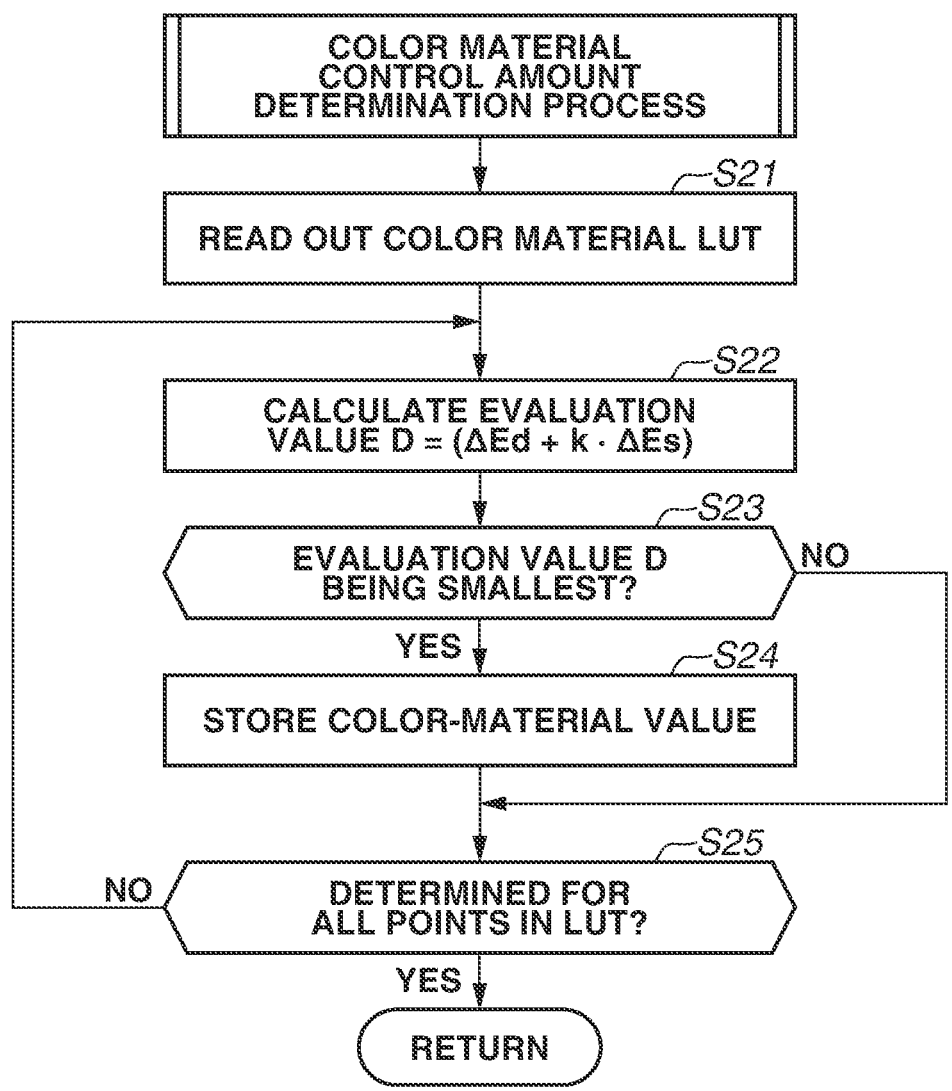
FIG. 5 is a flowchart illustrating a color material control amount determination process.

In step S2 in FIG. 3, the color material control amount determination process illustrated in FIG. 5 is executed. The process illustrated in FIG. 5 is implemented in such a manner that the CPU 11 of the image processing apparatus 10 reads out a necessary program stored in the ROM 12 or the like, and executes the read program. In this color material control amount determination process, an RGB value (a color-material value) is determined as the color material control amount of each pixel, based on the parameter $\rho_d$ indicating the diffuse component and the parameter $\rho_s$ indicating the specular intensity component. In the present exemplary embodiment, the color material control amount is determined by referring to a color material look-up table (a color material LUT), based on the parameters $\rho_d$ and $\rho_s$. FIG. 6 illustrates an example of the color material LUT.

As illustrated in FIG. 6, the four parameters $\rho_d$, $\rho_s$, $\alpha_x$, and $\alpha_y$ of the BRDF model are associated with the RGB value and stored in the color material LUT. In the color material LUT illustrated in FIG. 6, a column 41 indicates the RGB value, and columns 42 to 45 each indicate values of the colors of the respective four parameters. This color material LUT can be created as follows. First, patch image data having the colors indicated in the column 41 is created. Next, an image is formed by inputting the created patch image data into the surface color forming device 201. The formed image is then measured by a predetermined measurement method using, for example, a goniophotometer.

The color material control amount determination unit 102 compares the parameters $\rho_d$ and $\rho_s$ acquired by the image information acquisition unit 101, with the parameters $\rho_d$ and $\rho_s$ in the columns 42 and 43, respectively, of the color material LUT. This comparison is performed for all the rows of the color material LUT illustrated in FIG. 6. The color material control amount determination unit 102 then determines, as the color material control amount, the RGB value in the column 41 in a row having the highest degree of similarity.

In other words, first, in step S21 in FIG. 5, the color material control amount determination unit 102 reads out the color material LUT stored in a storage, such as the external memory 14, and the operation proceeds to step S22. In step S22, the color material control amount determination unit 102 calculates the degree of similarity, for a predetermined row selected in the color material LUT. In the present exemplary embodiment, an evaluation value D is calculated based on a distance, as the degree of similarity. The evaluation value D is calculated based on the following expression:

$$D = \Delta Ed + k \cdot \Delta Es \quad (3),$$

where, k is a constant.

Further, ΔEd and ΔEs are determined by the following expressions:

$$\Delta Ed = (\rho_{dLUT\_r}[m] - \rho_{d\_r})^2 + (\rho_{dLUT\_g}[m] - \rho_{d\_g})^2 + (\rho_{dLUT\_b}[m] - \rho_{d\_b})^2 \quad (4),$$

and $$\Delta Es = (\rho_{sLUT\_r}[m] - \rho_{d\_r})^2 + (\rho_{sLUT\_g}[m] - \rho_{d\_g})^2 + (\rho_{sLUT\_b}[m] - \rho_{d\_b})^2 \quad (5),$$

where $\rho_{d\_r}$, $\rho_{d\_g}$, and $\rho_{d\_b}$ represent the respective pieces of color information (R, G, and B) of the diffuse component $\rho_d$ input from the image information acquisition unit 101, and $\rho_s\_r$, $\rho_s\_g$, and $\rho_s\_b$ represent the respective pieces of color information (R, G, and B) of the specular intensity component $\rho_s$ input from the image information acquisition unit 101. Further, $\rho_{dLuT\_r}[m]$, $\rho_{dLUT\_q}[m]$, and $\rho_{dLUT\_b}[m]$ represent the values of r, g, and b, respectively, in the column 42 in an m-th row of the color material LUT. In addition, $\rho_{sLUT\_r}[m]$, $\rho_{sLUT\_g}[m]$, and $\rho_{sLUT\_b}[m]$ represent the values of r, g, and b, respectively, in the column 43 in the m-th row of the color material LUT.

Next, in step S23, the color material control amount determination unit 102 determines whether the evaluation value D calculated in step S22 is the smallest among the evaluation values D previously calculated. In a case where the evaluation value D is the smallest (YES in step S23), the operation proceeds to step S24. In step S24, the RGB value in the column 41, the parameter $\alpha_x$ in the column 44, and the parameter $\alpha_y$ in the column 45 in the currently selected row of the color material LUT are stored, and then the operation proceeds to step S25. On the other hand, in a case where the evaluation value D is determined not to be the smallest (NO in step S23), the operation directly proceeds to step S25. In step S25, the color material control amount determination unit 102 determines whether the processing for calculation and determination of the evaluation value D is performed for all the points (all the rows) in the color material LUT. In a case where there is a row not being subjected to the processing for calculation and determination of the evaluation value D (NO in step S25), the operation returns to step S22. In a case the processing for calculation and determination of the evaluation value D is performed for all the rows in the color material LUT (YES in step S25), the operation proceeds to step S3 in FIG. 3.

In this way, using the color material LUT, the RGB value corresponding to the smallest evaluation value D is determined as the color material control amount in the pixel. In addition, in this process, the specular spread components $\alpha_x$ and $\alpha_y$ corresponding to the determined color material control amount are also simultaneously stored, so that the shape control amount determination unit 103 can refer to these stored values as specular spread components $\alpha_x'$ and $\alpha_y'$. According to the present exemplary embodiment, the specular spread components $\alpha_x'$ and $\alpha_y'$ correspond to specular spread components to be obtained when a surface color is formed in the surface color forming device 201 based on the determined color material control amount. The method for determining the color material control amount is not limited to the above-described method, and various existing color matching algorithms can be used.

Figure 7:
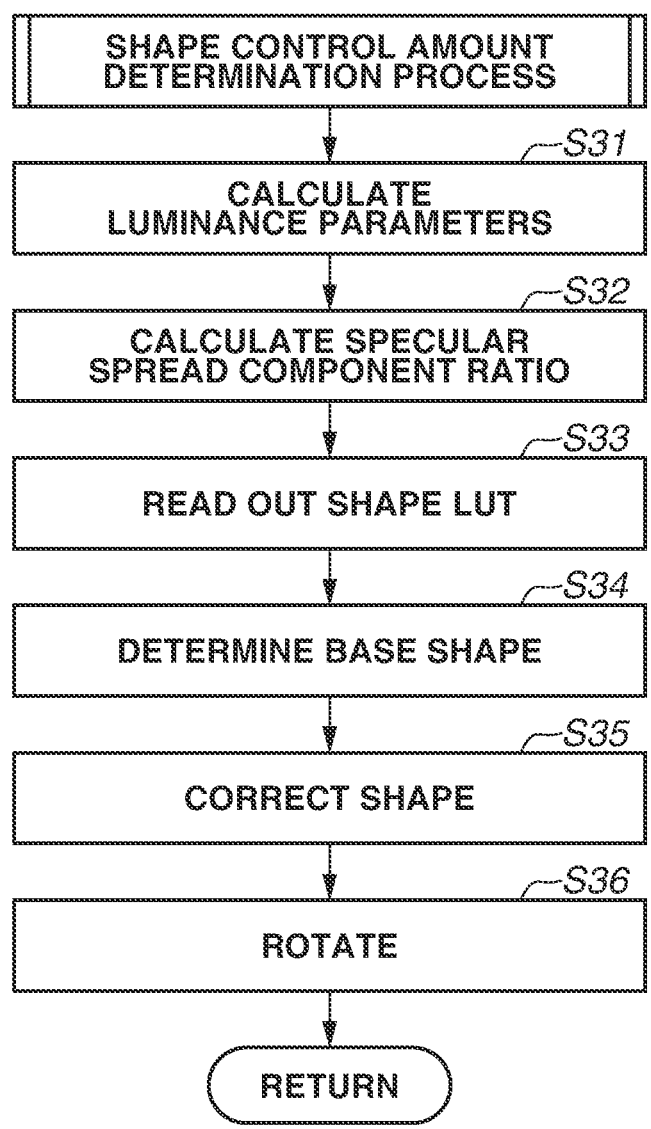
FIG. 7 is a flowchart illustrating a shape control amount determination process.

In step S3 in FIG. 3, the shape control amount determination process illustrated in FIG. 7 is executed. The process illustrated in FIG. 7, is implemented in such a manner that the CPU 11 of the image processing apparatus 10 reads out a necessary program stored in the ROM 12 or the like, and executes the read program. In this shape control amount determination process, the height information of 6×6 is determined as the shape control amount of each pixel, based on the specular spread components $\alpha_x$ and $\alpha_y$, the rotation angle φ, and the specular spread components $\alpha_x'$ and $\alpha_y'$.

First, in step S31 in FIG. 7, the shape control amount determination unit 103 calculates a specular spread component for a luminance. Specifically, a method, for example, for determining a weighted average of color information of three colors of R, G, and B is used in the parameters $\alpha_x$, $\alpha_y$, $\alpha_x'$, and $\alpha_y'$. In the following description of the shape control amount determination process, this weighted average is expressed as each of the parameters $\alpha_x$, $\alpha_y$, $\alpha_x'$, and $\alpha_y'$.

Next, in step S32, the shape control amount determination unit 103 calculates an Xratio between the specular spread components for an x direction, and a Yratio between the specular spread components for a y direction, by the following expressions:

$$X\text{ratio} = \alpha_x / \alpha_x' \quad (6), \text{ and}$$

$$Y\text{ratio} = \alpha_y / \alpha_y' \quad (7).$$

In the present exemplary embodiment, the shape control amount is determined by referring to a shape look-up table (a shape LUT), based on the Xratio and the Yratio.

In other words, in step S33, the shape control amount determination unit 103 reads out the shape LUT stored in a storage, such as the external memory 14, and then the operation proceeds to step S34. In step S34, the shape control amount determination unit 103 determines a base shape of the shape control amount by referring to the shape LUT, based on the Xratio and the Yratio. FIG. 8 illustrates an example of the shape LUT.

Figure 9A:
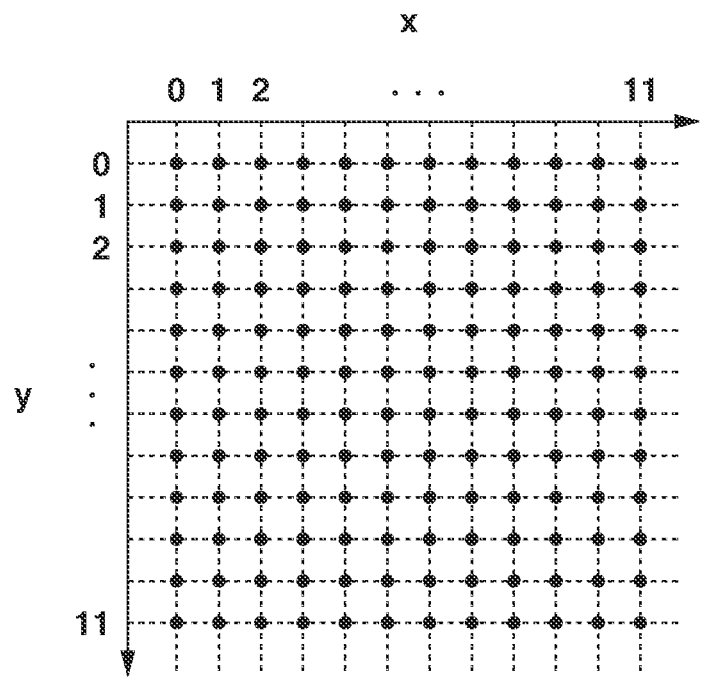
FIGS. 9A and 9B are diagrams each illustrating an example of a base shape.
Figure 9B:
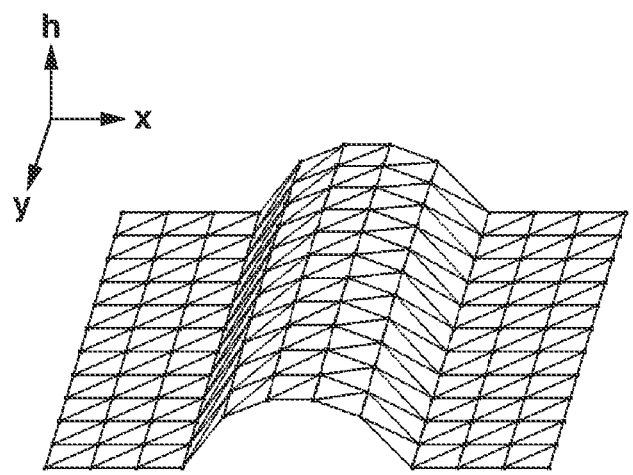

As illustrated in FIG. 8, in the shape LUT, base shape information is associated with the Xratio and the Yratio, and stored. In the shape LUT illustrated in FIG. 8, a column 51 indicates the Xratio and the Yratio, and a column 52 indicates the base shape information. In the present exemplary embodiment, the height information of 6×6 is calculated as the shape control amount for one pixel. Therefore, a plurality of pieces of base shape information, in which height information h(p,q) is recorded for grid points of a size larger than 6×6, is set in the shape LUT. FIG. 9A is a diagram illustrating an example of the grid points of the base shape information. FIG. 9B is a diagram illustrating an example of a three-dimensional shape of the base shape information. In this way, for example, 12× points in each of an x direction and a y direction, i.e., 12×12=114 points in total, are set, and the height information is set for each grid point.

By thus setting the height information using the grid points of a size larger than 6×6 that is the height information to be output, the height information in a range of the 6×6 output size can be calculated, even if a rotation process (step S36 in FIG. 7) to be described below is performed. This size of the grid points is, desirably, equal to or greater than a size of √2 times the grid points on one side of an output size.

Figure 10:
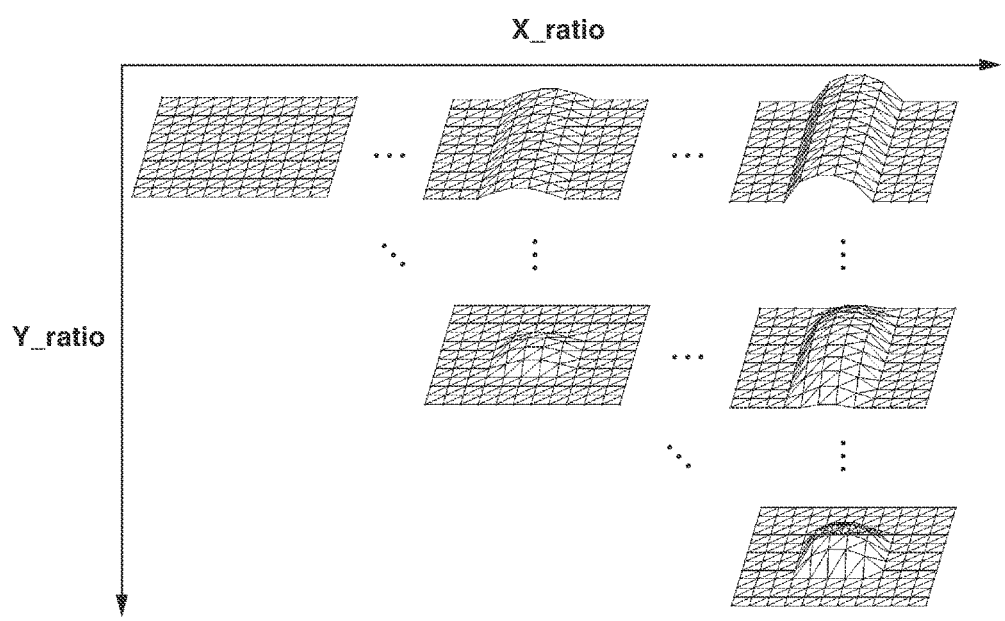
FIG. 10 is a diagram illustrating the shape LUT.

Further, for the rotation process to be described below, the shape LUT may hold the base shape information corresponding to an upward triangular matrix as illustrated in FIG. 10. Here, as illustrated in FIG. 10, by setting the irregularity of the shape to be larger as the Xratio or the Yratio becomes higher, the larger spread of the specular can be produced as the Xratio or the Yratio becomes higher. Further, it is desirable to set shapes to be identical in the x direction and the y direction on a diagonal line in which the Xratio and the Yratio are equal, so that a specular spread becomes isotropic. In addition, it is desirable to set shapes to be different in the x direction and the y direction so that the larger the difference between the Xratio and the Yratio is, the stronger the anisotropy can be produced.

In this way, the base shape is determined in step S34 in FIG. 7. Next, in step S35, the shape control amount determination unit 103 performs a shape correction process for restricting a rate of change in the normal line of a surface shape. In a case where the color-material specular spread component of each of $\alpha_x'$ and $\alpha_y'$ is small relative to a change in the normal line of the shape information, specular reflected light is separated in a plurality of directions according to the normal direction of the irregularity. Therefore, in this step S35, the base shape is corrected to restrict the rate of change in the normal line of the irregularity, according to the color-material specular spread components $\alpha_x'$ and $\alpha_y'$.

Specifically, a change (a differential value) of the height information in the x direction is calculated. In a case where the calculated value is greater than a threshold set beforehand according to the specular spread component $\alpha_x'$, processing for reducing the height by multiplying the height information by a value less than 1 is repeated. Next, a change (a differential value) of the height information in the y direction is similarly calculated. In a case where the calculated value is greater than a threshold set beforehand according to the specular spread component $\alpha_y'$, processing for reducing the height by multiplying the height information by a value less than 1 is repeated.

Lastly, in step S36, the shape control amount determination unit 103 rotates the base shape corrected in step S35 by the rotation angle $\varphi$, thereby calculating the height information of the 6×6 size to be eventually output. In this step S36, first, the shape control amount determination unit 103 determines x' and y' coordinates, by rotating x and y of the height information of 12×12, about the center coordinates ((x,y)=(5.5,5.5) in FIG. 9A) thereof, by the rotation angle cp. The height information of 12×12 is the base shape corrected in step S35. Next, from x', y' and h space, a height h of x and y coordinates corresponding to the height information of 6×6 to be output is calculated using interpolation processing or the like. In FIG. 9A, for 6×6 grid points (x coordinates of 3 to 8, and y coordinates of 3 to 8) around the central coordinates, a height is calculated from the x', y', and h space, and this height information is determined as the shape information of this pixel.

As described above, the image processing apparatus 10 acquires the information about the BRDF for each pixel, as the image information about the image to be formed. The image processing apparatus 10 then determines, based on the acquired image information, the color material control amount (the color material control information) for forming the color of each pixel of the image to be formed in the surface color forming device 201. Further, based on the determined color material control amount, and the specular spread component in the acquired image information, the image processing apparatus 10 determines the shape control amount (the shape information) for forming the shape of each pixel of the image to be formed in the shape forming device 202. In this way, according to the present exemplary embodiment, the shape control amount for forming the surface shape can be uniquely determined, based on the intended specular spread component, and the color material control amount for each pixel.

In addition, the image processing apparatus 10 determines the color material control amount pixel by pixel. In other words, the color-material values are identical in all the polygons in one pixel. In this way, the color-material values are uniformly determined for one pixel, i.e., the color-material value is not determined polygon by polygon. Therefore, a calculation amount necessary for the determination of the color material control amount and the shape control amount can be greatly reduced.

Further, in the determination of the shape control amount, the image processing apparatus 10 uses the specular spread components ($\alpha_x$ and $\alpha_y$) in the input image information, and the specular spread components ($\alpha_x'$ and $\alpha_y'$) to be obtained when the color is formed in the surface color forming device 201 based on the color material control amount. Specifically, the image processing apparatus 10 determines the shape control amount, based on the ratio between the specular spread components in the input image information, and the specular spread components to be obtained when the color is formed in the surface color forming device 201 based on the color material control amount. Therefore, the shape control amount, with which the intended specular spread can be produced, can be determined in consideration of the specular spread to be obtained when a color-material layer is formed on the surface by the surface color forming device 201.

Furthermore, the image processing apparatus 10 refers to the look-up table (the shape LUT) indicating the correspondence between the above-described specular spread component ratio and the shape control amount to thereby determine the shape control amount based on the ratio. In this way, the shape control amount for producing the optical anisotropy of the input information can be easily determined by using the shape LUT.

In this process, the image processing apparatus 10 derives the ratios ($\alpha_x/\alpha_x'$ and $\alpha_y/\alpha_y'$) of the specular spread components in the input image information, to the specular spread components to be obtained when the color is formed in the surface color forming device 201 based on the color material control amount. The image processing apparatus 10 then determines the shape control amount in such a manner that the higher the ratio is, the larger the specular spread becomes. Therefore, the shape control amount can be appropriately determined for producing the optical anisotropy of the input information.

The image processing apparatus 10 holds beforehand the look-up table (the color material LUT) indicating the correspondence between the color material control amount, and the specular spread component (each of $\alpha_x'$ and $\alpha_y'$) to be obtained when the color is formed in the surface color forming device 201 based on the color material control amount. The image processing apparatus 10 derives the specular spread components ($\alpha_x'$ and $\alpha_y'$) based on the color material control amount, by referring to the color material LUT. Therefore, the specular spread components ($\alpha_x'$ and $\alpha_y'$) can be easily derived.

The information indicating the specular spread component is two-dimensionally expressed by the tangent vector direction (x-axis) and the binormal vector direction (y-axis). Therefore, the anisotropy of the specular spread can be appropriately expressed. In addition, since information about the BRDF for each of a plurality of colors (RGB) is used as the image information to be input, an image to be formed can be appropriately formed.

Further, the image processing apparatus 10 performs, on the shape control amount, the shape correction process for restricting the rate of change in the normal line of the shape to be formed in the shape forming device 202, based on the color material control amount. Specifically, the image processing apparatus 10 corrects the shape control amount by threshold-based processing, using the threshold that is determined according to the specular spread components ($\alpha_x'$ and $\alpha_y'$) to be obtained when the color is formed in the surface color forming device 201 based on the color material control amount. This can suppress separation of the specular reflected light due to a decrease in the color-material specular spread components ($\alpha_x'$ and $\alpha_y'$) in response to a change in the normal line of the shape.

Furthermore, the image processing apparatus 10 determines the color material control amount based on the diffuse component ($\rho_d$) and the specular intensity component ($\rho_s$) of the BRDF in the input image information. Therefore, the intensity of the intended diffuse reflection and the intensity of the intended specular reflection can be appropriately reproduced. In addition, in determining the color material control amount, the image processing apparatus 10 uses the look-up table (the color material LUT) indicating the correspondence of the diffuse component ($\rho_d$), the specular intensity component ($\rho_s$), and the color material control amount. Therefore, the color material control amount can be easily determined.

As described above, in the present exemplary embodiment, an image having optical anisotropy can be appropriately formed without performing complicated computation.

Figure 11A:
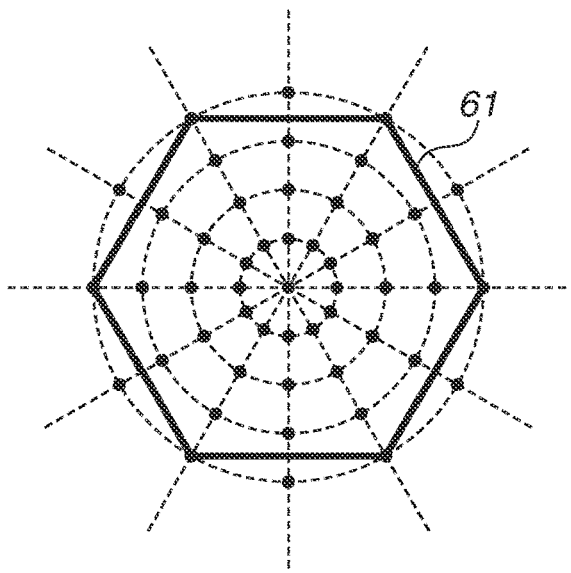
FIGS. 11A, 11B, and 11C are diagrams illustrating another example of how the shape control amount is determined.
Figure 11B:
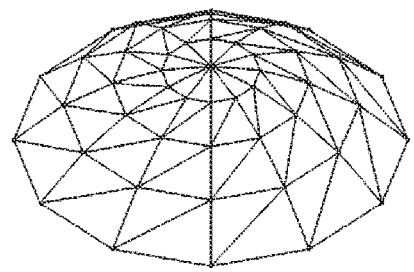
Figure 11C:
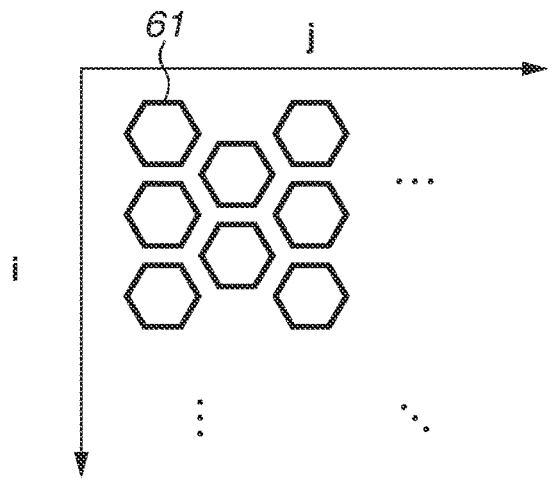

In the above-described exemplary embodiment, the grid points of the base shape are described to form a square lattice as illustrated in FIG. 9A, but are not limited to this form. For example, the grid points can be arranged concentrically around the central coordinates, as illustrated in FIG. 11A. By determining the base shape using the concentrically arranged grid points, a hemispheric shape can be more accurately formed, as illustrated in FIG. 11B. In this case, the shape of one pixel, which is a unit of an area for producing a BRDF, may be a regular hexagon, as represented by a pixel 61 in FIG. 11A. In this case, as illustrated in FIG. 11C, the pixels each having the shape of a regular hexagon can be arranged to form a honeycomb structure. This allows such setting that the specular spread component changes for each area forming a honeycomb structure of a regular hexagon. Therefore, the density of the pixel producing the BRDF can be prevented from changing depending on the direction.

If the density of the pixel producing the BRDF changes depending on the direction, unintentional anisotropy of glossiness may be included in a macro BRDF when a plurality of pixels are collectively viewed, such as when the pixels are viewed from a long viewing distance. A high-resolution image without such an adverse effect can be acquired, by arranging the pixels to have the density not varying depending on the direction, in the manner described above.

In the above-described exemplary embodiment, the shape control amount may be determined in consideration of a change in the shape information due to the formation of the color-material layer on the surface by the surface color forming device 201. FIG. 12A illustrates a shape after a color material is applied to a smooth surface in the surface color forming device 201. Then, a color layer is formed by the surface color forming device 201, after a shape based on shape information illustrated in FIG. 12B is formed by the shape forming device 202. In such a manner, a shape formed by combining the shape in FIG. 12A and the shape in FIG. 12B is to be obtained, as illustrated in FIG. 12C.

Therefore, first, based on the color material control amount, the shape information for the color layer corresponding to FIG. 12A is calculated using, for example, a look-up table and halftoning information of the surface color forming device 201. Next, the calculated shape information for the color layer is subtracted from the intended shape information in FIG. 12C. The shape control amount corresponding to FIG. 12B can be thereby determined. Therefore, an image having a shape intended to be obtained eventually can be appropriately formed.

Next, a second exemplary embodiment of the present disclosure will be described.

Figure 13:
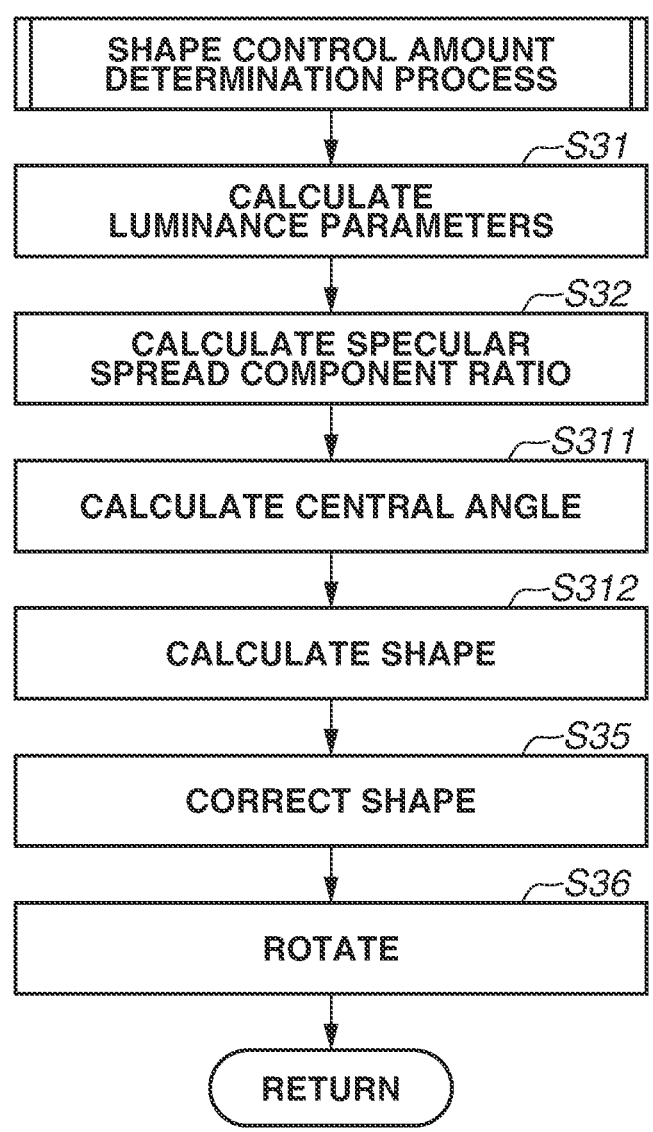
FIG. 13 is a flowchart illustrating another example of the shape control amount determination process.

According to the first exemplary embodiment, the shape control amount is determined using the shape LUT. In contrast, in the second exemplary embodiment, the shape control amount is determined without using the shape LUT. FIG. 13 is a flowchart illustrating a shape control amount determination process for determining the shape control amount without using the shape LUT. The process illustrated in FIG. 13 is similar to the process in FIG. 7, except that step S33 and step S34 in FIG. 7 are replaced with step S311 and step S312. Therefore, a different part of the process will be mainly described below.

In step S311, the shape control amount determination unit 103 calculates a central angle $\theta_x$ in the x direction and a central angle $\theta_y$ in the y direction. In the present exemplary embodiment, a specular spread is produced by controlling distribution of the normal line to a micro-plane of the shape information. Specifically, the shape control amount is determined in such a manner that the distribution range of the normal line falls within an acceptable distribution range. The central angles $\theta_x$ and $\theta_y$ each correspond to a central angle of an arc for determining the acceptable distribution range.

Figure 14:
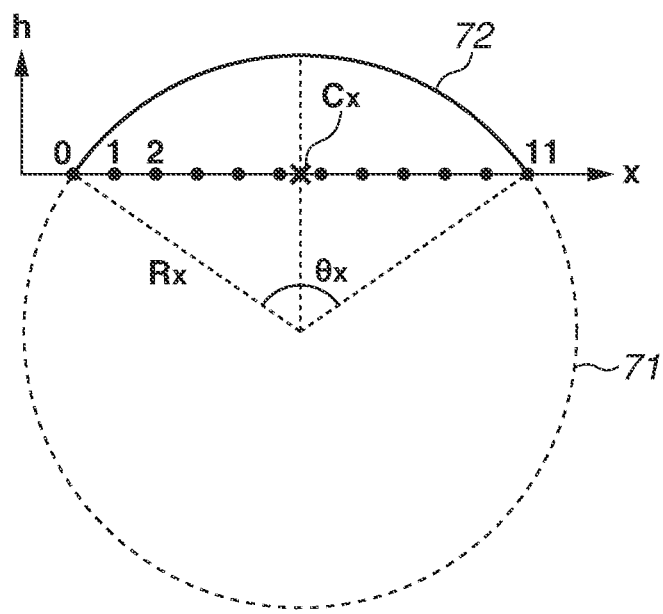
FIG. 14 is a diagram illustrating a central angle $\theta_x$.

FIG. 14 is a diagram illustrating the central angle $\theta_x$ in the x direction. The height information h in each grid point on the x-axis is formed on an arc 72 in a circle 71. The arc 72 can be drawn if the central angle $\theta_x$ and a range of the grid points (a range of x=0 to 11 in FIG. 14) is determined. That is, the arc 72 can be changed by the central angle $\theta_x$. In other words, the normal line distribution range of the shape information can be controlled by the central angles $\theta_x$ and $\theta_y$.

In step S311 in FIG. 13, the shape control amount determination unit 103 calculates the central angle $\theta_x$ and the central angle $\theta_y$ from the Xratio and the Yratio calculated, respectively, in step S32. The central angles $\theta_x$ and $\theta_y$ are calculated using, for example, a function set beforehand or a one-dimensional look-up table.

Next, in step S312, the shape control amount determination unit 103 calculates height information h(x,y) of each grid point corresponding to the central angles $\theta_x$ and $\theta_y$. The height information h(x,y) can be calculated by the following expression:

$$h(x,y)=\sqrt{R_x^2-(x-c_y)^2}+\sqrt{R_y^2-(y-c_y)^2}-t_x-t_y \quad (8),$$

$$R_x=d_x/\sin(0,2) \quad (9)$$

$$R_y=d_y/\sin(0,2) \quad (10),$$

$$t_x=\sqrt{R_y^2-d_x^y} \quad (11), \text{ and}$$

$$t_y=\sqrt{R_z^2-d_z^2} \quad (12).$$

In the above expression, $h(x,y)=0$ is assumed when $h(x,y)<0$.

Figure 15:
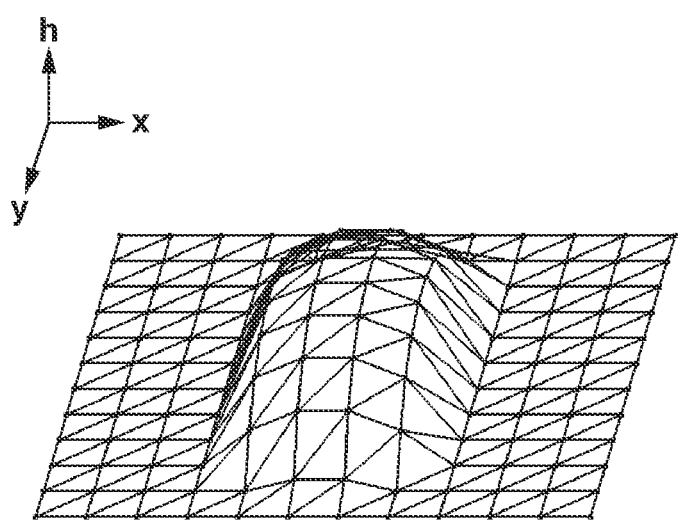
FIG. 15 is a diagram illustrating an example of a shape control amount.

According to the present exemplary embodiment, $(c_x,c_y)$ represents the central coordinates of the grid points, and $(c_x,c_y)$ is (5.5,5.5) in the example illustrated in FIG. 14. Further, $d_x$ and $d_y$ are constants for determining an arc range, and the constants are each set based on a distance from the center. For example, if the height information of one pixel is to be eventually expressed as a size of 6×6, the constants $d_x$ and $d_y$ can each be set as 3, i.e., half of 6. However, the method for setting the constants $d_x$ and $d_y$ is not limited to this method. FIG. 15 illustrates an example of the height information formed by the above-described method. FIG. 15 illustrates the height information when the constant $d_x$ is set at about 2.5, the constant $d_y$ is set at about 5, the central angle $\theta_x$ is set at about 179 degrees, and the central angle $\theta_y$ is set at about 120 degrees.

In this way, according to the method not using the shape look-up table, memory capacity to be required for the processing is reduced and therefore, a content with optical anisotropy can be output at a lower cost.

In the above-described exemplary embodiments, the rotation process for rotating the base shape information is performed based on the rotation angle φ in step S36 in each of FIGS. 7 and 13, but this is not limitative. In other words, if the rotation can be ignored, the rotation process can be omitted.

Further, in the above-described exemplary embodiments, a normal vector for each pixel may be added as a parameter to be input. In this case, a transformation process for transforming the shape in such a manner that the direction of the normal vector is matched with the input normal vector may be performed on the calculated shape information. This allows accurate production of an image, even if the image has pixels each of which has a normal vector different from each other.

According to the above-described exemplary embodiments, the two-dimensional information $\alpha_x$ and $\alpha_y$ are input as the specular spread component. However, if the production of anisotropy is unnecessary, a one-dimensional specular spread component may be input. In this case, the shape look-up table may be referred to, for a location of $\alpha_x=\alpha_y$ (a diagonal element in FIG. 10). Further, the color information of each pixel, for example, the RGB value, may be acquired independently of the bidirectional reflectance distribution function.

An exemplary embodiment of the present disclosure can also be implemented by such processing that a program that implements one or more functions of the above-described exemplary embodiments is supplied to a system or apparatus via a network or storage medium. One or more processors in a computer of the system or apparatus read out the program and then execute the read program. Moreover, an exemplary embodiment of the present disclosure can also be implemented by a circuit (e.g., an application-specific integrated circuit (ASIC)) that implements one or more functions.

According to the exemplary embodiments of the present disclosure, optical anisotropy can be easily produced without increase of calculator resources.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-094485, filed May 3, 2015, which is hereby incorporated by reference herein in its entirety.

What is claimed is:

1. An image processing apparatus comprising:
   one or more processors; and
   one or more memories storing instructions, when executed by the one or more processors, causing the apparatus to:
   acquire information about a bidirectional reflectance distribution function for each pixel, as information about an image to be formed;
   determine color information for forming color of each pixel of the image, based on the acquired information; and
   based on information that indicates a correspondence of a first specular spread component in a case of forming the color based on the determined color information, a second specular spread component in the acquired bidirectional reflectance distribution function, and shape information for forming a shape of each pixel of the image, determine the shape information.

2. The image processing apparatus according to claim 1, wherein the one or more processors further operate to determine the color information pixel by pixel.

3. The image processing apparatus according to claim 1, wherein the one or more processors further operate to hold a look-up table indicating a correspondence between a ratio of the first specular spread component to the second specular spread component and the shape information, and
wherein the one or more processors further operate to determine the shape information, by referring to the held look-up table, based on the ratio.

4. The image processing apparatus according to claim 3, wherein the one or more processors further operate to set an acceptable distribution range of a normal line of the shape based on the ratio, and determine the shape information in which a range of the normal line of the shape falls within the acceptable distribution range.

5. The image processing apparatus according to claim 3, wherein the shape information is determined in such a manner that a specular spread increases with an increase in a ratio of the second specular spread component to the first specular spread component.

6. The image processing apparatus according to claim 1, wherein the one or more processors further operate to hold a look-up table indicating a correspondence between the color information and the first specular spread component, and
wherein the one or more processors further operate to derive the first specular spread component, by referring to the held look-up table, based on the determined color information.

7. The image processing apparatus according to claim 1, wherein the information indicating the second specular spread component is two-dimensional information indicating anisotropy of a specular spread.

8. The image processing apparatus according to claim 1, wherein the information about the image to be formed is information about the bidirectional reflectance distribution function for each of a plurality of colors.

9. The image processing apparatus according to claim 1, wherein the one or more processors further operate to restrict a rate of change in a normal line of the shape, based on the determined color information.

10. The image processing apparatus according to claim 1, wherein the one or more processors further operate to determine the shape information for each regular hexagon-shaped area forming a honeycomb structure.

11. The image processing apparatus according to claim 1, wherein the one or more processors further operate to determine the color information, based on a diffuse component and a specular intensity component in the bidirectional reflectance distribution function of each pixel.

12. The image processing apparatus according to claim 11, wherein the one or more processors further operate to hold a look-up table indicating a correspondence of the diffuse component, the specular intensity component, and the color information, and
wherein the one or more processors further operate to determine the color information, by referring to the held look-up table, based on the diffuse component and the specular intensity component.

13. The image processing apparatus according to claim 1, wherein the one or more processors further operate to form an image based on the color information and the shape information.

14. An image processing method comprising:
acquiring information about a bidirectional reflectance distribution function for each pixel, as information about an image to be formed;
determining color information for forming color of each pixel of the image, based on the acquired information; and
determining, based on information that indicates a correspondence of a first specular spread component in a case of forming the color based on the determined color information, a second specular spread component in the bidirectional reflectance distribution function, and shape information for forming a shape of each pixel of the image, the shape information.

15. A non-transitory computer readable storage medium storing a program for causing a processor to execute an image processing method, the image processing method comprising:
acquiring information about a bidirectional reflectance distribution function for each pixel, as information about an image to be formed;
determining color information for forming color of each pixel of the image, based on the acquired information; and
determining, based on information that indicates a correspondence of a first specular spread component in a case of forming the color based on the determined color information, a second specular spread component in the bidirectional reflectance distribution function, and shape information for forming a shape of each pixel of the image, the shape information.

16. The image processing apparatus according to claim 1, wherein the one or more processors further operate to determine the shape information, by referring to the information that indicates a correspondence between a ratio of the first specular spread component to the second specular spread component and the shape information.

* * * * *